US010481396B2

(12) United States Patent
Du et al.

(10) Patent No.: US 10,481,396 B2
(45) Date of Patent: Nov. 19, 2019

(54) IMAGING DEVICE AND IMAGING METHOD

(71) Applicant: Beijing Zhigu Rui Tuo Tech Co., Ltd, Beijing (CN)

(72) Inventors: Lin Du, Beijing (CN); Hongjiang Zhang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 14/779,968

(22) PCT Filed: Dec. 4, 2013

(86) PCT No.: PCT/CN2013/088531
§ 371 (c)(1),
(2) Date: Sep. 24, 2015

(87) PCT Pub. No.: WO2014/206011
PCT Pub. Date: Dec. 31, 2014

(65) Prior Publication Data
US 2016/0103323 A1 Apr. 14, 2016

(30) Foreign Application Priority Data
Jun. 28, 2013 (CN) .......................... 2013 1 0268508

(51) Int. Cl.
*G02B 27/01* (2006.01)

(52) U.S. Cl.
CPC ..... *G02B 27/0172* (2013.01); *G02B 27/0179* (2013.01); *G02B 2027/014* (2013.01);
(Continued)

(58) Field of Classification Search
CPC ................ G02B 27/01; G02B 27/0093; G02B 27/0172; G02B 27/0179; G02B 27/017;
(Continued)

(56) References Cited

U.S. PATENT DOCUMENTS 4,264,154 A 4/1981 Petersen
4,572,616 A 2/1986 Kowel et al.
(Continued)

FOREIGN PATENT DOCUMENTS

CN 1372650 A 10/2002
CN 1470227 1/2004
(Continued)

OTHER PUBLICATIONS

Jeong, et al. "Tunable microdoublet lens array", Optics Express, vol. 12, Issue 11, May 2004, pp. 2494-2500.
(Continued)

*Primary Examiner* — Ibrahim A Khan
(74) *Attorney, Agent, or Firm* — Amin, Turocy & Watson, LLP

(57) ABSTRACT

An apparatus includes: an imaging lens module, used to image at least one object, and including a plurality of subregions having adjustable imaging parameters; a position sensing module, used to obtain position information of at least one object relative to an imaging apparatus; an information processing module, used to determine an imaging parameter of a corresponding subregion of the imaging lens module according to the position information of at least one object relative to the imaging apparatus; and a lens adjustment module, used to adjust the imaging parameter of the corresponding subregion of the imaging lens module according to the determined imaging parameter. The apparatus can adjust an imaging parameter for regions corresponding to a plurality of target objects at different distances in a visual field, and enable a user to watch objects at different distances in a visual field comfortably, thereby improving user experience.

48 Claims, 10 Drawing Sheets

(52) U.S. Cl.
CPC ............ *G02B 2027/0138* (2013.01); *G02B 2027/0178* (2013.01); *G02B 2027/0187* (2013.01)

(58) Field of Classification Search
CPC .... G02B 2027/0138; G02B 2027/0187; G02B 2027/014; G02B 2027/0127; G02B 2027/0178; G09G 5/00; H04N 5/232; H04N 5/225; A61B 3/113
See application file for complete search history.

(56) References Cited

U.S. PATENT DOCUMENTS

| | | | |
|---|---|---|---|
| 4,973,149 A | 11/1990 | Hutchinson | |
| 5,182,585 A | 1/1993 | Stoner | |
| 5,537,163 A | 7/1996 | Ueno | |
| 6,038,080 A | 3/2000 | Schachar | |
| 6,072,443 A | 6/2000 | Nasserbakht et al. | |
| 6,111,597 A | 8/2000 | Tabata | |
| 6,151,061 A | 11/2000 | Tokuhashi | |
| 6,152,563 A | 11/2000 | Hutchison et al. | |
| 6,325,513 B1 | 12/2001 | Bergner et al. | |
| 7,001,020 B2 | 2/2006 | Yancey et al. | |
| 7,298,414 B2 | 11/2007 | Stavely et al. | |
| 7,334,892 B2 | 2/2008 | Goodall et al. | |
| 7,486,988 B2 | 2/2009 | Goodall et al. | |
| 7,764,433 B2 | 7/2010 | Kam et al. | |
| 7,766,479 B2 | 8/2010 | Ebisawa | |
| 8,104,892 B2 | 1/2012 | Hillis et al. | |
| 8,109,632 B2 | 2/2012 | Hillis et al. | |
| 8,282,212 B2 | 10/2012 | Hillis et al. | |
| 8,384,999 B1 | 2/2013 | Crosby et al. | |
| 8,896,632 B2 | 11/2014 | MacDougall et al. | |
| 2002/0101568 A1 | 8/2002 | Eberl et al. | |
| 2002/0113943 A1 | 8/2002 | Trajkovic et al. | |
| 2003/0043303 A1 | 3/2003 | Karuta et al. | |
| 2003/0125638 A1 | 7/2003 | Husar et al. | |
| 2005/0003043 A1 | 1/2005 | Sewalt et al. | |
| 2005/0014092 A1 | 1/2005 | Hasegawa et al. | |
| 2005/0030438 A1 | 2/2005 | Nishioka | |
| 2006/0016459 A1 | 1/2006 | McFarlane et al. | |
| 2006/0103808 A1 | 5/2006 | Horie | |
| 2006/0122530 A1 | 6/2006 | Goodall et al. | |
| 2006/0146281 A1 | 7/2006 | Goodall et al. | |
| 2006/0164593 A1 | 7/2006 | Peyghambarian et al. | |
| 2006/0122531 A1 | 8/2006 | Goodall et al. | |
| 2007/0019157 A1 | 1/2007 | Hills et al. | |
| 2007/0211207 A1 | 9/2007 | Lo et al. | |
| 2008/0002262 A1 | 1/2008 | Chirieleison | |
| 2008/0106633 A1* | 5/2008 | Blum ..................... G02C 7/08 348/345 |
| 2009/0066915 A1 | 3/2009 | Lai | |
| 2009/0189974 A1 | 7/2009 | Deering | |
| 2009/0279046 A1 | 11/2009 | Dreher et al. | |
| 2009/0303212 A1 | 12/2009 | Akutsu et al. | |
| 2010/0053539 A1 | 3/2010 | Lin | |
| 2011/0018903 A1 | 1/2011 | Lapstun et al. | |
| 2011/0019258 A1 | 1/2011 | Levola | |
| 2011/0213462 A1 | 1/2011 | Holladay | |
| 2011/0051087 A1 | 3/2011 | Inoue et al. | |
| 2011/0199202 A1 | 8/2011 | De Mers et al. | |
| 2011/0242277 A1 | 10/2011 | Do et al. | |
| 2011/0279277 A1 | 11/2011 | Li-Chung | |
| 2012/0007959 A1 | 1/2012 | Kwon et al. | |
| 2012/0013389 A1 | 1/2012 | Thomas et al. | |
| 2012/0038549 A1 | 2/2012 | Mandella et al. | |
| 2012/0092618 A1 | 4/2012 | Yoo et al. | |
| 2012/0113235 A1 | 5/2012 | Shintani | |
| 2012/0127062 A1 | 5/2012 | Bar-Zeev et al. | |
| 2012/0127422 A1 | 5/2012 | Tian et al. | |
| 2012/0133891 A1 | 5/2012 | Jiang | |
| 2012/0140044 A1 | 6/2012 | Galstian et al. | |
| 2012/0154277 A1 | 6/2012 | Bar-Zeev et al. | |
| 2012/0169730 A1 | 7/2012 | Inoue | |
| 2012/0206485 A1 | 8/2012 | Osterhout et al. | |
| 2012/0212499 A1 | 8/2012 | Haddick et al. | |
| 2012/0212508 A1 | 8/2012 | Kimball | |
| 2012/0242698 A1 | 9/2012 | Haddick et al. | |
| 2012/0290401 A1 | 11/2012 | Neven | |
| 2012/0293773 A1* | 11/2012 | Publicover ............. A61B 3/113 351/210 |
| 2012/0307208 A1 | 12/2012 | Trousdale | |
| 2013/0044042 A1 | 2/2013 | Olsson et al. | |
| 2013/0050432 A1 | 2/2013 | Perez et al. | |
| 2013/0050646 A1 | 2/2013 | Nanbara | |
| 2013/0072828 A1 | 3/2013 | Sweis et al. | |
| 2013/0093997 A1 | 4/2013 | Utsunomiya et al. | |
| 2013/0107066 A1 | 5/2013 | Venkatraman et al. | |
| 2013/0127980 A1 | 5/2013 | Haddick et al. | |
| 2013/0135203 A1 | 5/2013 | Croughwell, III | |
| 2013/0147836 A1 | 6/2013 | Small et al. | |
| 2013/0194323 A1 | 8/2013 | Choi et al. | |
| 2013/0215504 A1 | 8/2013 | Kim et al. | |
| 2013/0241805 A1 | 9/2013 | Gomez | |
| 2013/0241927 A1 | 9/2013 | Vardi | |
| 2013/0278631 A1 | 10/2013 | Border et al. | |
| 2013/0335301 A1* | 12/2013 | Wong ................. G02B 27/0093 345/8 |
| 2013/0335404 A1 | 12/2013 | Westerinen et al. | |
| 2013/0335833 A1 | 12/2013 | Liao et al. | |
| 2013/0342572 A1 | 12/2013 | Poulos et al. | |
| 2014/0078175 A1 | 3/2014 | Forutanpour et al. | |
| 2014/0160157 A1 | 6/2014 | Poulos et al. | |
| 2014/0225915 A1 | 8/2014 | Theimer et al. | |
| 2014/0225918 A1 | 8/2014 | Mittal et al. | |
| 2014/0232746 A1 | 8/2014 | Ro et al. | |
| 2014/0240351 A1 | 8/2014 | Scavezze et al. | |
| 2014/0267400 A1 | 9/2014 | Mabbutt et al. | |
| 2014/0267420 A1 | 9/2014 | Schowengerdt et al. | |
| 2014/0282224 A1 | 9/2014 | Pedley | |
| 2014/0327875 A1 | 11/2014 | Blum et al. | |
| 2014/0354514 A1 | 12/2014 | Aronsson | |
| 2014/0375680 A1 | 12/2014 | Ackerman et al. | |
| 2015/0002542 A1 | 1/2015 | Chan et al. | |
| 2015/0035861 A1 | 2/2015 | Salter et al. | |
| 2015/0234184 A1 | 8/2015 | Schowengerdt et al. | |
| 2015/0235427 A1* | 8/2015 | Nobori .................. G06T 19/006 345/629 |
| 2015/0235632 A1 | 8/2015 | Liu et al. | |
| 2015/0070391 A1 | 9/2015 | Nishimaki et al. | |
| 2016/0034032 A1 | 2/2016 | Jeong | |
| 2016/0035139 A1 | 2/2016 | Fuchs et al. | |
| 2016/0062454 A1 | 3/2016 | Wang et al. | |
| 2016/0171772 A1 | 6/2016 | Ryznar et al. | |
| 2016/0189432 A1 | 6/2016 | Bar-Zeev et al. | |
| 2016/0196603 A1 | 7/2016 | Perez et al. | |
| 2016/0299360 A1 | 10/2016 | Fonte et al. | |
| 2016/0370605 A1 | 12/2016 | Ain-Kedem | |
| 2017/0092235 A1 | 3/2017 | Osman et al. | |

FOREIGN PATENT DOCUMENTS

| | | |
|---|---|---|
| CN | 1141602 | 3/2004 |
| CN | 1527126 | 9/2004 |
| CN | 1604014 | 4/2005 |
| CN | 1645244 A | 7/2005 |
| CN | 1653374 | 8/2005 |
| CN | 1901833 | 1/2007 |
| CN | 1912672 A | 2/2007 |
| CN | 2868183 | 2/2007 |
| CN | 1951314 | 4/2007 |
| CN | 101069106 | 11/2007 |
| CN | 101072534 | 11/2007 |
| CN | 101097293 | 1/2008 |
| CN | 101103902 | 1/2008 |
| CN | 201005945 | 1/2008 |
| CN | 101116609 | 2/2008 |
| CN | 101155258 | 4/2008 |
| CN | 101194198 A | 6/2008 |
| CN | 101430429 | 5/2009 |
| CN | 201352278 | 11/2009 |
| CN | 201360319 Y | 12/2009 |
| CN | 101662696 | 3/2010 |
| CN | 201464738 | 5/2010 |

(56) References Cited

FOREIGN PATENT DOCUMENTS

| | | |
|---|---|---|
| CN | 101782685 | 7/2010 |
| CN | 101819331 | 9/2010 |
| CN | 101819334 | 9/2010 |
| CN | 201637953 | 11/2010 |
| CN | 101900927 A | 12/2010 |
| CN | 101917638 A | 12/2010 |
| CN | 201754203 | 3/2011 |
| CN | 102008288 | 4/2011 |
| CN | 102083390 A | 6/2011 |
| CN | 102203850 | 9/2011 |
| CN | 102292017 | 12/2011 |
| CN | 102419631 | 4/2012 |
| CN | 102481097 | 5/2012 |
| CN | 101149254 | 6/2012 |
| CN | 102487393 | 6/2012 |
| CN | 202267785 U | 6/2012 |
| CN | 102572483 | 7/2012 |
| CN | 102576154 | 7/2012 |
| CN | 202383380 | 8/2012 |
| CN | 102918444 | 2/2013 |
| CN | 102939557 | 2/2013 |
| CN | 102981270 | 3/2013 |
| CN | 103054695 | 4/2013 |
| CN | 103065605 | 4/2013 |
| CN | 103150013 | 6/2013 |
| CN | 103190883 | 7/2013 |
| CN | 103197757 | 7/2013 |
| CN | 103280175 | 9/2013 |
| CN | 103297735 | 9/2013 |
| CN | 103353663 | 10/2013 |
| CN | 103353667 | 10/2013 |
| CN | 103353677 A | 10/2013 |
| CN | 103558909 | 2/2014 |
| DE | 19959379 | 7/2000 |
| EP | 2646859 | 10/2013 |
| JP | 03023431 | 1/1991 |
| JP | 2676870 | 11/1997 |
| JP | H09289973 | 11/1997 |
| JP | 3383228 | 3/2003 |
| JP | 2003307466 | 10/2003 |
| JP | 2005058399 | 3/2005 |
| JP | 2007129587 | 5/2007 |
| JP | 201143876 | 3/2011 |
| JP | 2012199621 | 10/2012 |
| JP | 2012247449 | 12/2012 |
| TW | 201012448 | 4/2010 |
| WO | 2004023167 | 3/2004 |
| WO | 2005077258 | 8/2005 |
| WO | 2012075218 A1 | 6/2012 |
| WO | 2012083415 | 6/2012 |
| WO | 2013074851 | 5/2013 |

OTHER PUBLICATIONS

International Search report dated Jun. 12, 2014 for PCT Application No. PCT/CN2013/088554, 4 pages.
International Search Report dated Jan. 8, 2015 for PCT Application No. PCT/CN2014/088242, 2 pages.
International Search Report dated May 5, 2014 for PCT Application No. PCT/CN2013/088544, 4 pages.
International Search Report dated Jun. 5, 2014 for PCT Application No. PCT/CN2013/088549, 4 pages.
Smith, et al., "Determining Driver Visual Attention With One Camera", IEEE Transactions on Intelligent Transportation Systems, vol. 4, No. 4, December 2003, 14 Pages.
Singh, et al., "Human Eye Tracking and Related Issues: A Review", International Journal of Scientific and Research Publications, vol. 2, Issue 9, Sep. 2012, ISSN 2250-3153, 9 pages.
Ji et al., "Real-Time Eye, Gaze and Face Pose Tracking for Monitoring Driver Vigilance", Real-Time Imaging 8, 357-377 (2002) available online at http://www.idealibrary.com, 21 pages.
Office Action dated Dec. 29, 2016 for U.S. Appl. No. 14/780,519, 25 pages.
Office Action dated Feb. 27, 2017 for U.S. Appl. No. 14/783,495, 39 pages.
Office Action dated Apr. 21, 2017 for U.S. Appl. No. 14/781,581, 19 pages.
Office Action dated Apr. 20, 2017 for U.S. Appl. No. 14/781,578, 77 pages.
Office Action dated Mar. 30, 2017 for U.S. Appl. No. 15/028,019, 36 pages.
International Search Report dated Apr. 3, 2014 for PCT Application No. PCT/CN2013/088531, 10 pages.
International Search Report dated Mar. 6, 2014 for PCT Application No. PCT/CN2013/088540, 8 pages.
International Search Report dated May 28, 2014 for PCT Application No. PCT/CN2013/088545, 4 pages.
International Search Report dated May 28, 2014 for PCT Application No. PCT/CN2013/088553, 6 pages.
International Search Report dated Feb. 27, 2014 for PCT Application No. PCT/CN2013/088522, 6 pages.
International Search Report dated May 8, 2014 for PCT Application No. PCT/CN2013/088547, 4 pages.
Kim et al., "A 200 s Processing Time Smart Image Sensor for an Eye Tracker using pixel-level analog image processing", IEEE Journal of Solid-State Circuits, vol. 44, No. 9, Sep. 2009, 10 pages.
Hansen et al., "In the eye of the beholder: a survey of models for eyes and gaze", IEEE Transactions on pattern analysis and machine intelligence, vol. 32, No. 3, Mar. 2010, 23 pages.
Office Action dated Jun. 29, 2017 for U.S. Appl. No. 14/783,495, 50 pages.
Office Action dated Jun. 29, 2017 for U.S. Appl. No. 14/783,503, 120 pages.
Gao et al. "Measuring Directionality of the Retinal Reflection with a Shack-Hartmann Wavefront Sensor", Dec. 2009, Optics Express, vol. 17, No. 25, Optical Society of America, 20 pages.
Office Action dated Jul. 12, 2017 for U.S. Appl. No. 14/780,519, 45 pages.
Office Action dated May 3, 2017 for U.S. Appl. No. 14/781,306, 46 pages.
Office Action dated Feb. 5, 2018 for U.S. Appl. No. 14/779,321, 38 pages.
Office Action dated Oct. 4, 2017 for U.S. Appl. No. 14/781,584, 95 pages.
Office Action dated Dec. 19, 2017 for U.S. Appl. No. 14/783,503, 78 pages.
Office Action dated Nov. 9, 2017 for U.S. Appl. No. 14/780,519, 24 pages.
Office Action dated Nov. 17, 2017 for U.S. Appl. No. 14/783,495, 32 pages.
Office Action dated Dec. 14, 2017 for U.S. Appl. No. 14/779,321, 82 pages.
Office Action dated Nov. 9, 2017 for U.S. Appl. No. 14/781,578, 64 pages.
Lee et al. "A Robust Eye Gaze Tracking Method Based on a Virtual Eyeball Model", Machine Vision and Applications, (2009) 20:319-337, Springer-Verlag, 2008. 19 pages.
Notice of Allowance dated Nov. 20, 2018 for U.S. Appl. No. 14/779,321, 31 pages.
Office Action dated Dec. 21, 2018 for U.S. Appl. No. 14/783,495, 35 pages.
Office Action dated Feb. 4, 2019 for U.S. Appl. No. 14/781,578, 69 pages.
Office Action dated Jun. 29, 2018 for U.S. Appl. No. 14/781,578, 67 pages.
Office Action dated Jun. 25, 2018 for U.S. Appl. No. 14/779,321, 43 pages.
Office Action dated Jun. 14, 2018 for U.S. Appl. No. 14/780,519, 29 pages.
Office Action dated Jul. 13, 2018 for U.S. Appl. No. 14/783,495, 36 pages.
Office Action dated Jul. 17, 2018 for U.S. Appl. No. 14/781,584, 75 pages.
Notice of Allowance dated Sep. 11, 2018 for U.S. Appl. No. 14/780,519, 29 pages.

(56) References Cited

OTHER PUBLICATIONS

Notice of Allowance received for U.S. Appl. No. 14/783,495 dated Apr. 17, 2019, 23 pages.
Non-Final Office Action received for U.S. Appl. No. 14/781,584 dated May 2, 2019, 105 pages.
Beauchemin et al., "The Computation of Optical Flow", ACM Computing Surveys, vol. 27, No. 3, Sep. 1995, pp. 433-467.

* cited by examiner

IMAGING DEVICE AND IMAGING METHOD

RELATED APPLICATION

This application is a U.S. National Stage filing under 35 U.S.C. § 371 of, and claims priority to, International Patent Cooperation treaty (PCT) application No. PCT/CN2013/088531, filed Dec. 4, 2013, and entitled "IMAGING DEVICE AND IMAGING METHOD," which claims priority to Chinese Patent Application No. 201310268508.5, filed with the Chinese Patent Office on Jun. 28, 2013 and entitled "IMAGING APPARATUS AND METHOD" which applications are hereby incorporated herein by reference in their respective entireties.

TECHNICAL FIELD

The subject application relates to the field of imaging technologies, and, more particularly, to imaging generation or capture.

BACKGROUND

Wearable devices such as Google glass and smartwatches are gradually accepted by people, and these electronic smart devices will make people's life more and more convenient.

Conventional myopia glasses or hyperopia glasses add a concave lens or a convex lens with a fixed focal length before the eye of a person that suffers from a refractive error to correct various refractive error problems of different causes. However, conventional glasses have the troubles of optometry and lens fitting, and can only solve problems such as correction within a certain distance range. For an object beyond a certain distance, a user may be unable to obtain a clear image and has an indistinct vision, or sees the object with a difficulty that the eyes get tired easily.

Based on the foregoing case, multi-focus glasses with each lens having a plurality of different focal lengths appear. By using an example in which glasses are worn for eyes with both presbyopia and myopia, the upper portion of the glass is a myopia lens and is used to help a user to see an object at a far place clearly; the lower portion of the glass is a hyperopia lens and is used to help a user to see an object at a near place clearly. However, the user needs to see a far place through the upper portion of the glass while see a near place through the lower portion; for example, the user needs to lower the head to see an object that is low at a far place and raise the head to see a object that is high at a near place; or the user needs to manually adjust the position of the glasses, which makes the use troublesome.

Similarly, healthy human eyes and an imaging recording apparatus such as a camera or a video recorder also cannot obtain clear images of objects at all distances within a visual field. For example, when healthy human eyes see an object very close to the eyes, the eyes may also see the object unclearly or get tired.

When a plurality of different objects of different depths exists in a visual field, the lens cannot switch rapidly among different focal lengths.

SUMMARY

A technical problem to be solved by the various embodiments is to provide an imaging apparatus and method, which enable an imaging receiver to comfortably receive clear images of objects at different distances, thereby improving user experience.

In a first aspect, an embodiment of the subject application provides an imaging apparatus, which includes:
   an imaging lens module, used to image at least one object, and including a plurality of subregions having adjustable imaging parameters;
   a position sensing module, used to obtain position information of the at least one object relative to the imaging apparatus;
   an information processing module, used to determine an imaging parameter of at least one corresponding subregion of the imaging lens module according to the position information of the at least one object relative to the imaging apparatus; and
   a lens adjustment module, used to adjust the imaging parameter of the corresponding subregion of the imaging lens module according to the determined imaging parameter.

In a second aspect, an embodiment of the subject application provides an imaging method, which includes:
   obtaining position information of at least one object relative to an imaging apparatus;
   determining an imaging parameter of at least one corresponding subregion of an imaging lens module according to the position information of the at least one object relative to the imaging apparatus; where the imaging lens module is used to image at least one object, and includes a plurality of subregions having adjustable imaging parameters; and
   adjusting the imaging parameter of the corresponding subregion of the imaging lens module according to the determined imaging parameter.

For an apparatus and method of embodiments of the subject application, an imaging lens module having a plurality of subregions having adjustable imaging parameters adjusts an imaging parameter of a corresponding subregion for an object according to a different distance of the object relative to the imaging lens module, which enables an imaging receiver (for example, a user's eyes) to conveniently obtain clear imaging of objects at different distances.

Particularly, for a user's eyes that suffers from a problem such as a refractive error, the apparatus and method of embodiments of the subject application may solve the problems, such as indistinct vision and eye exhaustion caused by insufficient (when myopic eyes see an object at a far place, or hyperopic eyes see an object at a near place) or excessive (myopic eyes see an object at a near place, or hyperopic eyes see an object at a far place) refractive correction, that occur in watching objects at different distances; problems of indistinct vision and eyes exhaustion caused by decreased lens adjustment range when presbyopic eyes see objects at a near place and at a far place at the same time; and problems of indistinct vision and eyes exhaustion caused by optical axis offsets from astigmatism and strabismus.

Also, compared with a lens with adjustable overall focal length, the apparatus and method of embodiments of the subject application do not need to continuously adjust the overall focal length of the lens according to different distances of objects, and therefore does not bring about undesirable experience such as dizziness for a user.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

A method and apparatus of various embodiments of the subject application are illustrated below in detail with reference to the accompanying drawings and embodiments.

An imaging receiver has a limited adjustment range of an imaging parameter such as a focal length. By using an example that the imaging receiver is a user's eyes (definitely, the imaging receiver may further be an imaging recording apparatus such as a video recorder and a camera), a user with a normal eyesight may be unable to see, or sees with a great difficulty, an object very close to the eyes. The adjustment range is limited further for eyes that have problems such as refractive errors such as myopia, hyperopia, presbyopia, and astigmatism and strabismus. By using presbyopic eyes that are not normal for both near vision and far vision as an example, to see an object clearly, the eyes often stay in an adjustment state, which easily causes eye exhaustion. Although common glasses can be worn for correction, glasses in the prior art can hardly perform imaging correction for objects at both a far place and a near place.

Figure 1:
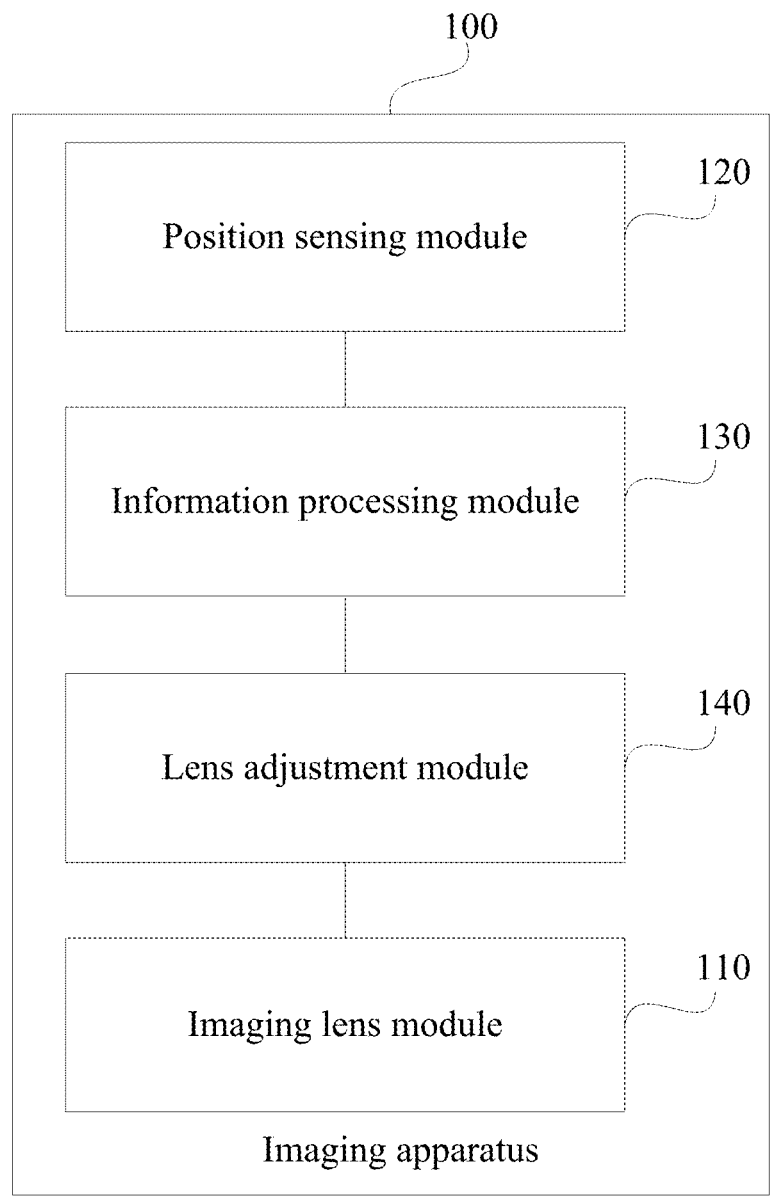
FIG. 1 is a schematic structural block diagram of an imaging apparatus according to an embodiment of the subject application.

Therefore, as shown in FIG. 1, an embodiment of the subject application discloses an imaging apparatus 100, which includes:

an imaging lens module 110, used to image at least one object, and including a plurality of subregions having adjustable imaging parameters. Here, the subregions may be subregions physically independent from each other, or may also be logical subregions obtained by logically dividing one physically integral imaging lens module;

a position sensing module 120, used to obtain position information of at least one object relative to the imaging apparatus;

an information processing module 130, used to determine an imaging parameter of a corresponding subregion of the imaging lens module 110 according to the position information of the at least one object relative to the imaging apparatus; and a lens adjustment module 140, used to adjust the imaging parameter of the corresponding subregion of the imaging lens module 110 according to the determined imaging parameter.

An imaging receiver may obtain an expected image of the object through a corresponding subregion of the imaging lens module 110.

Through the imaging apparatus in an embodiment of the subject application, an imaging parameter can be adjusted for regions corresponding to a plurality of target objects at different distances in a visual field at the same time, respectively, which enables a user to comfortably watch objects at different distances in the visual field, respectively, thereby improving user experience.

Figure 2:
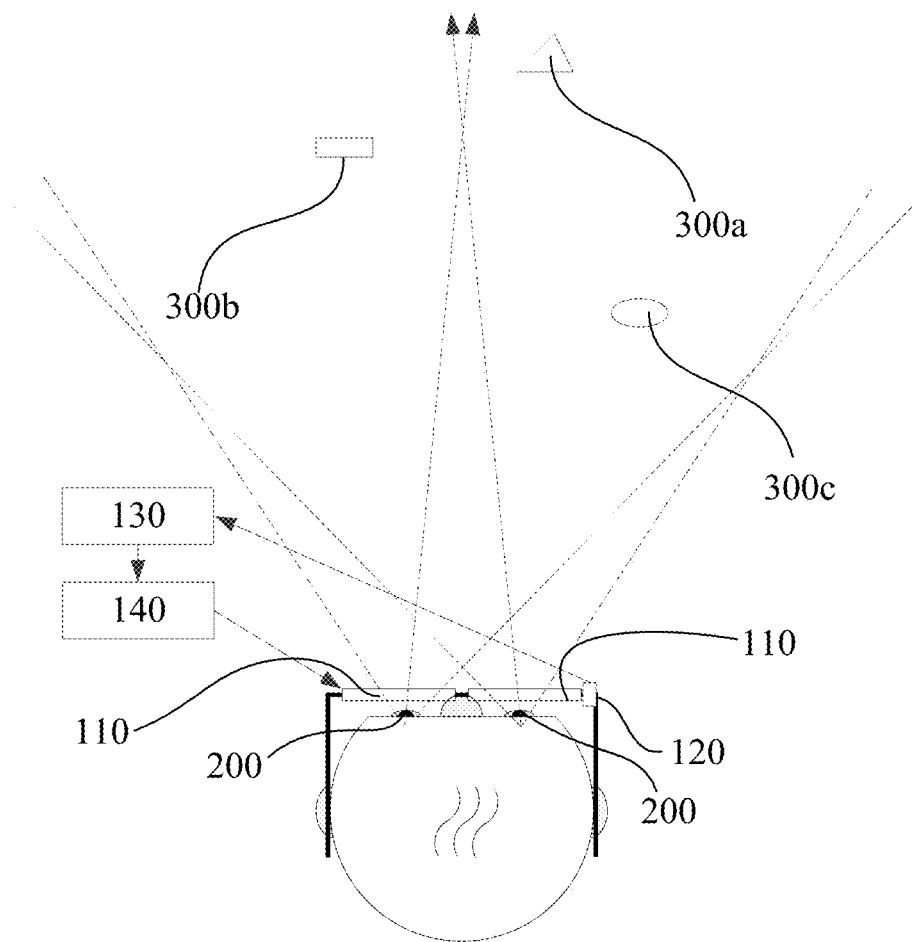
FIG. 2 is a schematic view of an application of an imaging apparatus according to an embodiment of the subject application.

As shown in FIG. 2, in an implementation manner of an embodiment of the subject application, an example in which the imaging apparatus 100 is glasses (here, except common glasses, the glasses may also be optical devices such as goggles and windshields), an imaging receiver 200 is a user's eyes, and the objects include a triangular object 300a, a rectangular object 300b, and an elliptic object 300c with decreasing distances from the imaging apparatus 100 is used for illustration, where the lens at each side of the glasses is the imaging lens module 110.

Figure 3:
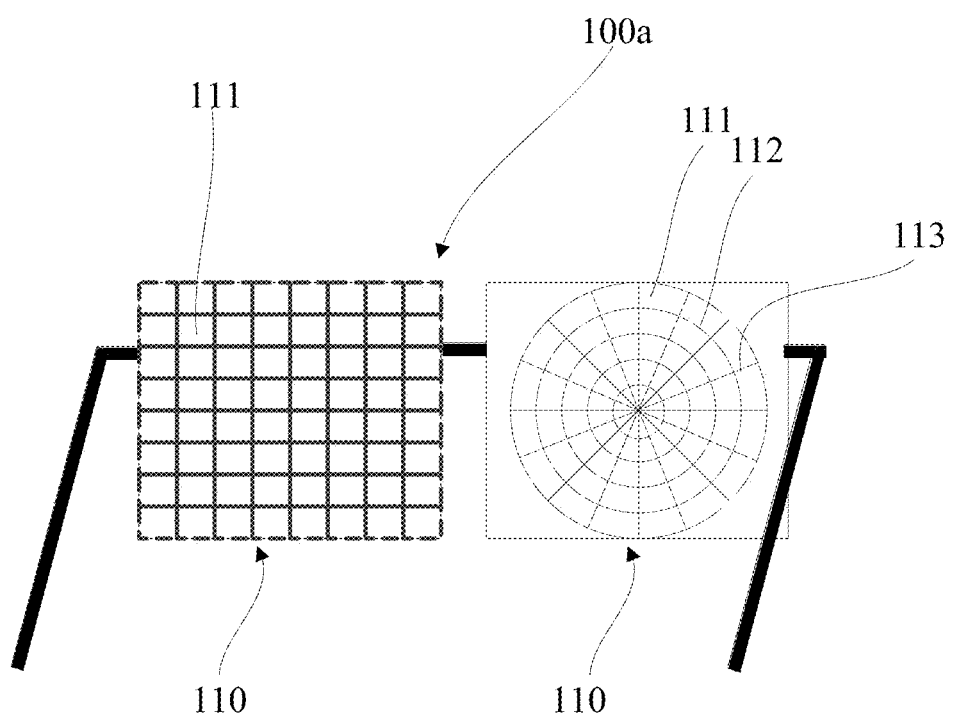
FIG. 3 is a schematic view of the subregion division of an imaging lens module in an imaging apparatus according to an embodiment of the subject application.

As shown in FIG. 3, in a possible implementation manner of an embodiment of the subject application, the imaging lens module 110 includes at least one lens. Here, an example in which each imaging lens module 110 only includes one lens is used for illustration.

In a preferred implementation manner of an embodiment of the subject application, the imaging parameter of a subregion 111 includes: a shape and/or a refractive index of a lens of the subregion 111.

In this implementation manner, the adjustment to the imaging parameter of the subregion 111 may be: for example, the curvature of the lens of the subregion 111 is adjusted to change the focal length of the subregion 111; or the refractive index of the lens of the subregion 111 is adjusted to change the focal length of the subregion 111. In addition, for an astigmatic user, the surface of the lens of the subregion 111 can be adjusted to a cylindrical surface to correct astigmatism; for a strabismal user, the surface of the lens of the subregion 111 can be adjusted to a prismatic surface to correct strabismus. Definitely, in other possible implementation manners of an embodiment of the subject application, the imaging lens module may further include two or more lenses, and in this case, for an astigmatic or strabismal user, the subregion 111 of one lens is adjusted to a cylindrical surface or a prismatic surface.

In this implementation manner, preferably, the subregions 111 of the imaging lens module are distributed in an array. Preferably, the imaging plane of the imaging lens group is divided in a mesh form to obtain the plurality of subregions 111. The plurality of subregions 111 may have a same size, or may also be different in size. Generally speaking, when the subregions 111 are divided smaller, the precision of adjustment is higher.

Preferably, as shown by the imaging lens group 110 on the left side of the glasses in FIG. 3, the subregions 111 are distributed in a rectangular array. In this implementation manner, the subregions 111 have the same size and are arranged in aligned rows and columns. In other implementation manners, the subregions may also be arranged in staggered rows and columns.

Preferably, as shown by the imaging lens group 110 on the right side of the glasses in FIG. 3, the subregions 111 are distributed in a radially concentric (formed by several concentric circles 112 and several radial lines 113 connecting adjacent concentric circles 112 in a radial direction) array. In this embodiment, the radial lines 113 of the radial concentric circles are arranged in an aligned manner. In other embodiments, radial lines 113 between every two adjacent concentric circles 112 may also be arranged in a nonaligned manner.

In FIG. 3 of this implementation manner, for the need of description, the imaging lens groups 110 of two different kinds of distribution of subregions are placed in one same pair of glasses. In a practical application, a pair of glasses usually has the same or similar distribution of subregions for the left and right imaging lens groups.

Definitely, a person skilled in the art shall understand that in addition to the foregoing rectangular array and radially concentric array, the subregions may further be distributed in another type of array or not in an array.

In a possible implementation manner of an embodiment of the subject application, preferably, the position sensing module 120 includes: a depth sensing unit, used to acquire position and depth information of the at least one object relative to the imaging apparatus.

Figure 4:
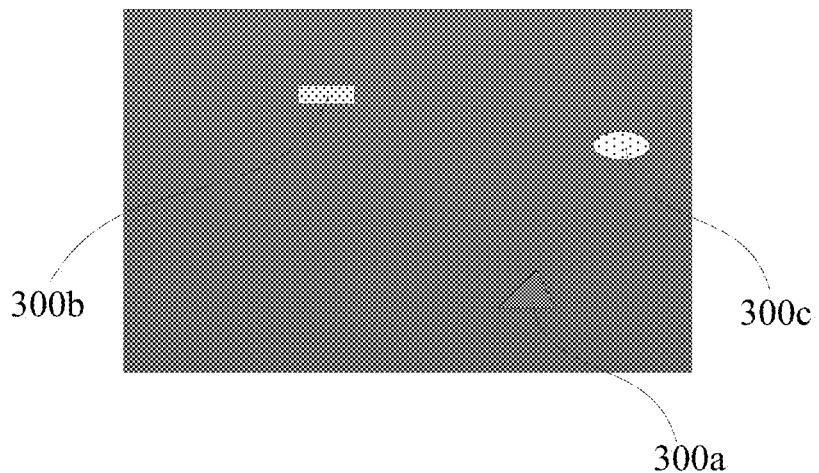
FIG. 4 is a depth view of a plurality of objects obtained by an imaging apparatus according to an embodiment of the subject application.

In a possible implementation manner of an embodiment of the subject application, the depth sensing unit is a depth detector. FIG. 4 is a depth view of objects at different distances obtained by the depth detector. The distance of an object may usually be represented by color. For example, an object that is farther has a darker color. In this implementation manner, the denseness of points represents the distance of an object, in which an object that is farther is filled with denser points. As can be seen, the elliptic object 300c on the right side is the closest to the imaging apparatus, the triangular object 300a is the farthest from the imaging apparatus, and the rectangular object 300b is between the above two. Therefore, the depth view records the position and depth information of the objects.

In other implementation manners of an embodiment of the subject application, the position sensing module 120 may also include:

an image sensor, used to acquire image information of the at least one object.

The position and depth information of an object may be obtained according to the image information of the object. For example: if the image sensor is a binocular image sensor, the position and depth information of the object may be obtained according to the image information obtained by the binocular image sensor. In addition, the distance of the object relative to the imaging lens module can be further obtained from the feature information of the object (target recognition and known sizes, for example, blue sky, white cloud, mountains, woods, and the like are usually far views, books, television screens, mobile phones, and the like are usually near views, and computer screens, roads, and the like are usually middle views) and/or the clarity information of the object that are obtained from the image information, the focusing distance, and the like (for example, the focusing distance of the image sensor is known, while a clear image in the image is at a position near the focusing distance), and to obtain the position and depth information of an object according to the image information of the object belongs to the prior art, which is therefore no longer elaborated here.

Figure 5A:
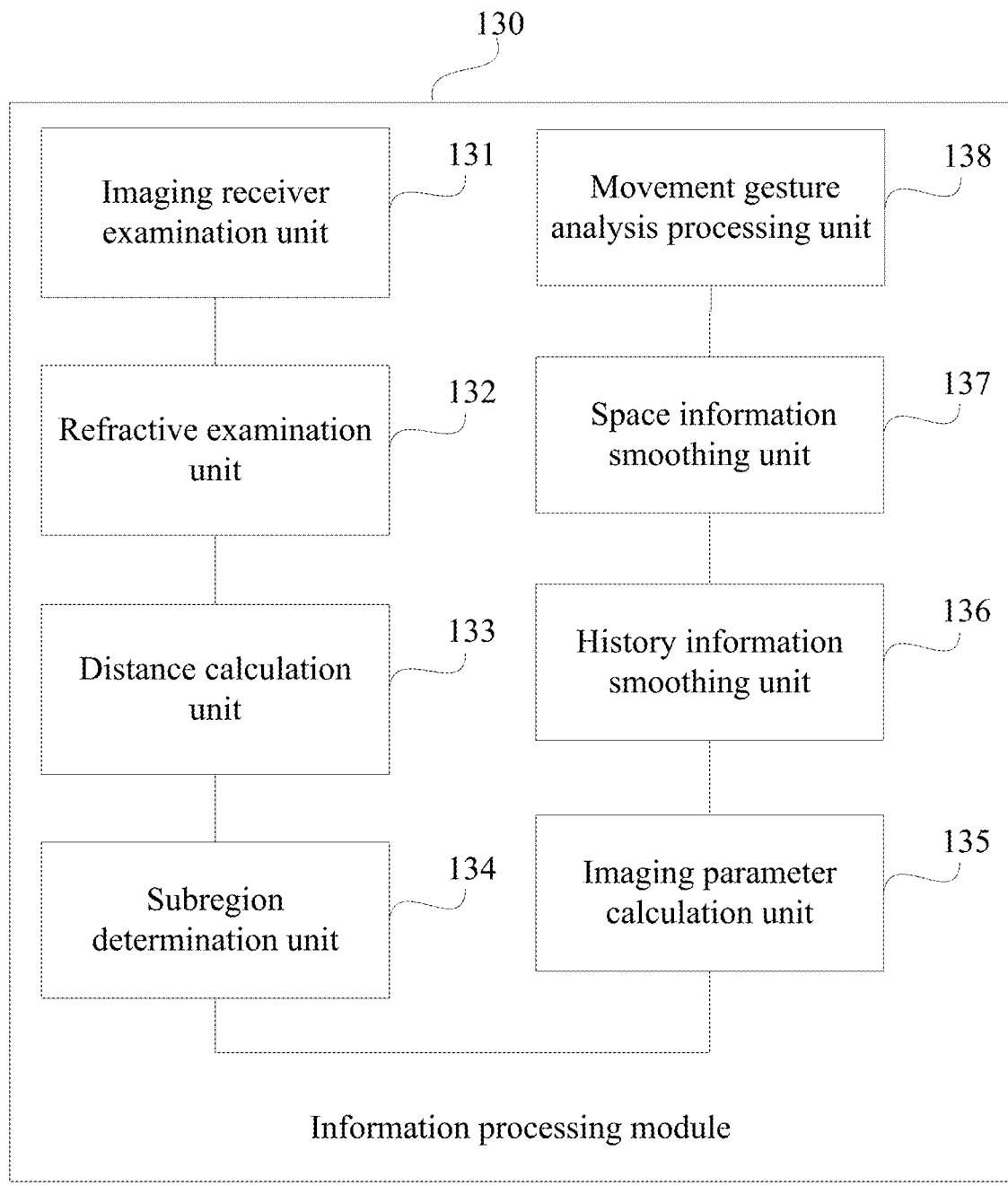
FIG. 5a is a schematic structural block diagram of an information processing module of an imaging apparatus according to an embodiment of the subject application.

As shown in FIG. 5a, in a possible implementation manner of an embodiment of the subject application, the information processing module 130 includes an imaging receiver examination unit 131, a refractive examination unit 132, a distance calculation unit 133, a subregion determination unit 134, and an imaging parameter calculation unit 135.

The imaging receiver examination unit 131 is used to determine a relative position relationship among the imaging lens module 110, the position sensing module 120, and the imaging receiver 200 (for example, the left and right pupils). In this implementation manner, the imaging receiver examination unit 131 can precisely correct the relative position relationship among the imaging lens module 110, the position sensing module 120, and the imaging receiver 200 to obtain more precise imaging parameters. However, in other implementation manners of an embodiment of the subject application, because the positions of the imaging lens module 110 and the position sensing module 120 are fixed when the imaging apparatus is complete, and also, the position of the time imaging receiver 200 relative to the imaging lens module 110 may be predicted (for example, the distance from a lens of glasses to an eye can usually be estimated within a reasonable offset), so that the information processing module 130 may also not include the imaging receiver examination unit 131.

The refractive examination unit 132 is used to learn corresponding imaging parameters when the imaging receiver 200 acquires expected images of objects at a plurality of distances, and obtain refractive examination information corresponding to the imaging receiver. Here, the expected image may be, for example, a clear image or a relatively clear image of an object. When the imaging receiver 200 is eyes, the expected image here may be a clear or relatively clear image of an object that a user's eyes watch comparatively comfortably, that is, when the user watches the clear image of the object, the eyes do not require excessive adjustment and do not get exhausted easily.

Table 1 shows a representative example of refractive examination information of a myopia user corresponding to the imaging receiver in this embodiment obtained in this implementation manner. Here, the target distance is the distance between an object and an imaging apparatus (in other implementation manners, the distance between an object and the imaging receiver can further be selected as the target distance). The optimal refractivity is the refractivity that a corresponding region of the imaging lens module is required to reach when the user's eyes watch the clear image of the object comfortably at the target distance. In other embodiments of the subject application, the refractive examination information may further include, for example, optical parameter information for other refractive errors such as astigmatism or strabismus.

TABLE 1

Representative example of refractive examination information

| Target distance | 0.1 m | 0.2 m | 0.5 m | 1 m | 10 m | 50 m | 100 m | Infinitely far |
|---|---|---|---|---|---|---|---|---|
| Optimal refractivity | −0.5 | −2.5 | −5.5 | −5.75 | −6.00 | −6.25 | −6.50 | −6.75 |

For example, it is assumed that the distance between an object and the imaging apparatus is 1 m, and therefore the imaging parameter of the subregion corresponding to the object corresponds to the refractivity −5.75. It is assumed that the distance between an object and the imaging apparatus is 0.8 m, and therefore the optimal refractivity corresponding to the distance of 0.8 m may be obtained through an interpolation method according to the corresponding optimal refractivities of 0.5 m and 1 m, and an imaging parameter of a corresponding subregion is further obtained. A person skilled in the art should know that when the granularity of the distance of the object for learning the imaging parameter corresponding to the imaging receiver is smaller, more refractive examination information is obtained, and the accuracy of the imaging parameter of the required subregion obtained through the refractive examination information is higher.

The distance calculation unit 133 is used to calculate the distance of the at least one object relative to the imaging lens module 110 according to the position information of the at least one object relative to the imaging apparatus. Here, the distance of the at least one object relative to the imaging lens module 110 may be directly obtained from the position information. For example, the position information is the depth view information obtained by the depth sensing unit, and the distance of the object relative to the imaging lens module 110 may be directly obtained from the view. In addition, the distance of the at least one object relative to the imaging lens module 110 can further be obtained through calculation and analysis of, for example, image information of the object obtained by the optical sensor. For example, the distance of the object relative to the imaging lens module 110 is obtained through the feature information of the object and/or the clarity information of the object in the image information of the object, the focusing distance, and the like as discussed above.

Figure 6A:
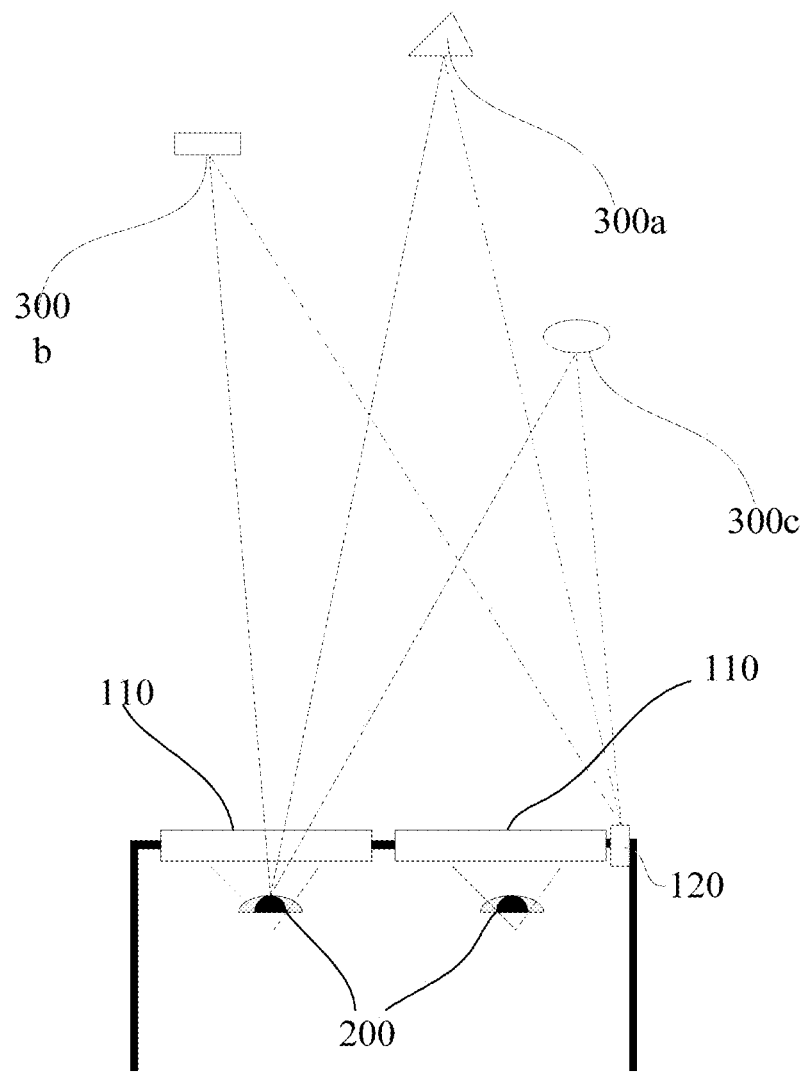
FIG. 6a is a schematic view of obtaining a projection of an object on an imaging lens module according to an embodiment of the subject application.
Figure 6B:
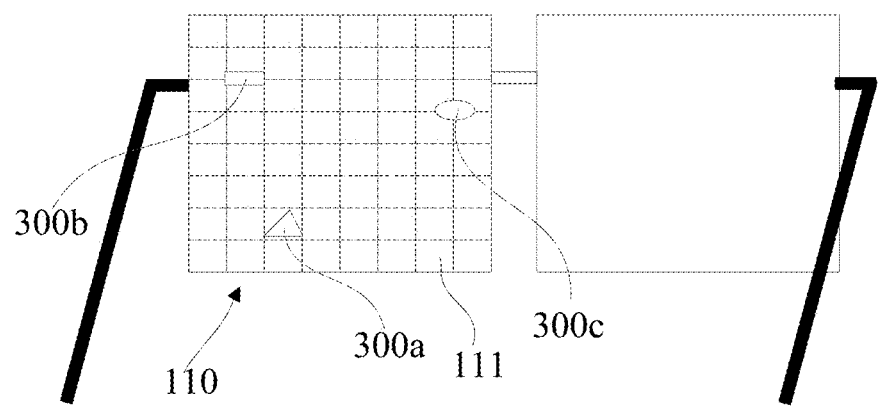
FIG. 6b is a schematic view of a corresponding subregion of an object on an imaging lens module according to an embodiment of the subject application.

The subregion determination unit 134 is used to determine a subregion 111 corresponding to the object on the imaging lens module. As shown in FIG. 6a, the projection of the object on the imaging lens module 110 can be obtained through geometrical optics and a triangular relationship. As shown in FIG. 6b, according to the projection of the object, the subregion 111 corresponding to the object may be determined. As can be seen from FIG. 6b, the object may only correspond to one subregion 111 (for example, the triangular object 300a), or may also correspond to a plurality of subregions 111 (for example, the rectangular object 300b and the elliptic object 300c).

The imaging parameter calculation unit 135 is used to calculate the imaging parameter of the corresponding subregion 111 of each object according to the distance of each object relative to the imaging lens module 110 and the refractive examination information. In this implementation manner, the imaging parameter of the corresponding subregion 111 of each object is calculated through the lookup method based on Table 1.

Figure 5B:
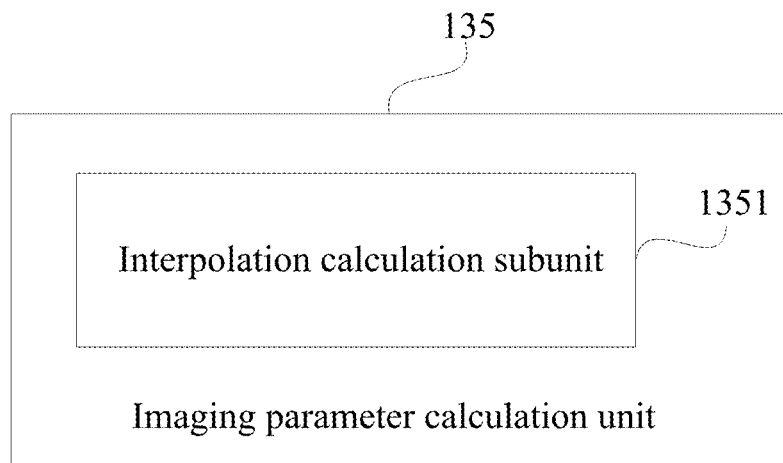
FIG. 5b is a schematic structural block diagram of an imaging parameter calculation unit in an imaging apparatus according to an embodiment of the subject application.

Preferably, as shown in FIG. 5b, in this implementation manner, the imaging parameter calculation unit 135 further includes an interpolation calculation subunit 1351, used to obtain the imaging parameters of other subregions 111 between corresponding subregions 111 of the objects through a two-dimensional interpolation algorithm, so as to generate a smooth transition effect.

In this implementation manner, to prevent hopping of each subregion in time and space on the imaging lens module 110, the information processing module 130 further includes a history information smoothing unit 136 and a space information smoothing unit 137.

The history information smoothing unit 136 is used to perform smoothing processing of time on the current imaging parameter of each subregion 111 according to history information of the imaging parameter of each subregion 111.

The space information smoothing unit 137 is used to perform smoothing processing of space on the imaging parameter of each subregion 111 according to the imaging parameter of each subregion 111 of the imaging lens module.

To avoid that when a user moves at a high speed, because an object in a visual field keeps changing, timely adjustment fails as the adjustment speed of the imaging apparatus cannot follow the speed that the object changes or the user feels dizzy though timely adjustment succeeds, preferably, in a possible implementation manner of an embodiment of the subject application, as shown in FIG. 5a, the information processing module 130 further includes:

a movement gesture analysis processing unit 138, used to determine the imaging parameter of the corresponding subregion 111 on the imaging lens module 110 according to movement gesture information of the imaging apparatus.

Here, the movement gesture information of the imaging apparatus includes: the relative movement gesture information of the imaging apparatus and the object and/or the movement speed information of the imaging apparatus.

Preferably, in this implementation manner, the movement gesture information of the imaging apparatus can be acquired by adding a movement gesture sensing module in the imaging apparatus.

Figure 5C:
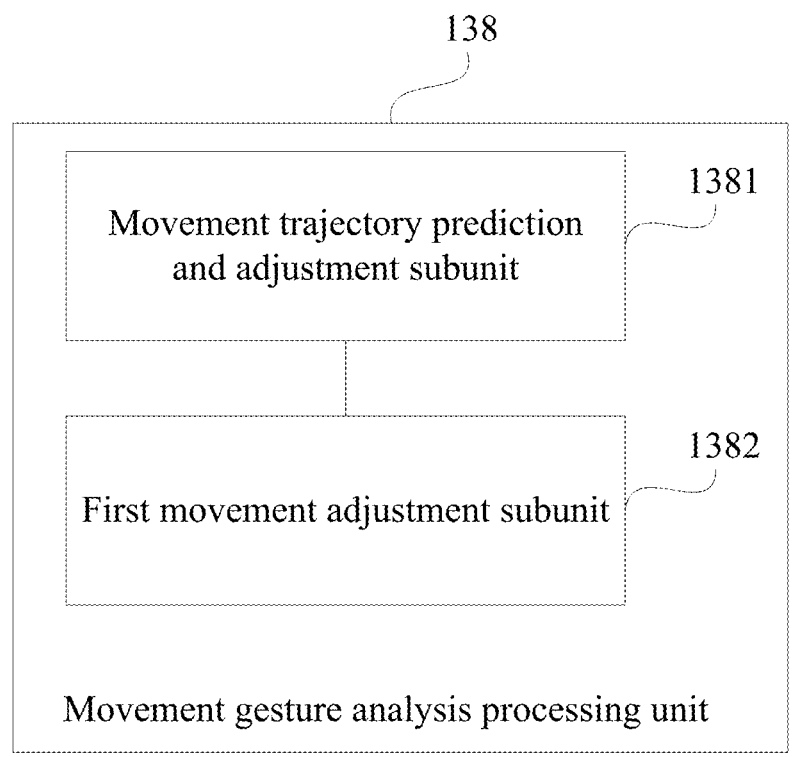
FIG. 5c is a schematic structural block diagram of a movement gesture analysis processing unit in an imaging apparatus according to an embodiment of the subject application.

Preferably, as shown in FIG. 5c, the movement gesture analysis processing unit 138 includes:

a movement trajectory prediction and adjustment subunit 1381, used to predict the imaging parameter of the corresponding subregion 111 of the object at a next moment according to the relative movement gesture information of the imaging apparatus and the object and the imaging parameter of the corresponding subregion 111 of the object at a current moment.

Figure 7:
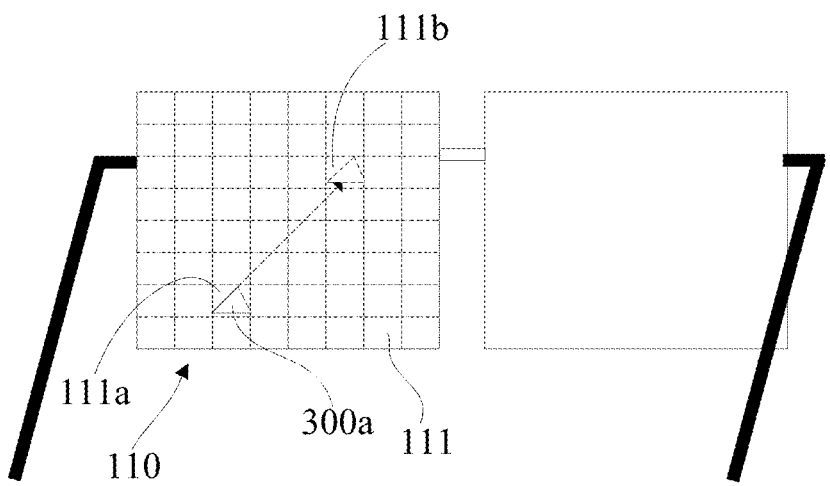
FIG. 7 is a schematic view that an imaging apparatus predicts a corresponding subregion of an object at a next moment according to relative movement gesture information of the imaging apparatus and the object according to an embodiment of the subject application.

As shown in FIG. 7, for example, the object 300a corresponds to the first subregion 111a at the current moment, and the focal length of the first subregion 111a is A. The movement trajectory prediction and adjustment subunit 1381 predicts that at a next moment the object a corresponds to a second subregion b according to the relative movement gesture information of the imaging apparatus and the object, and obtains that the focal length of the second subregion b is also A.

Figure 5D:
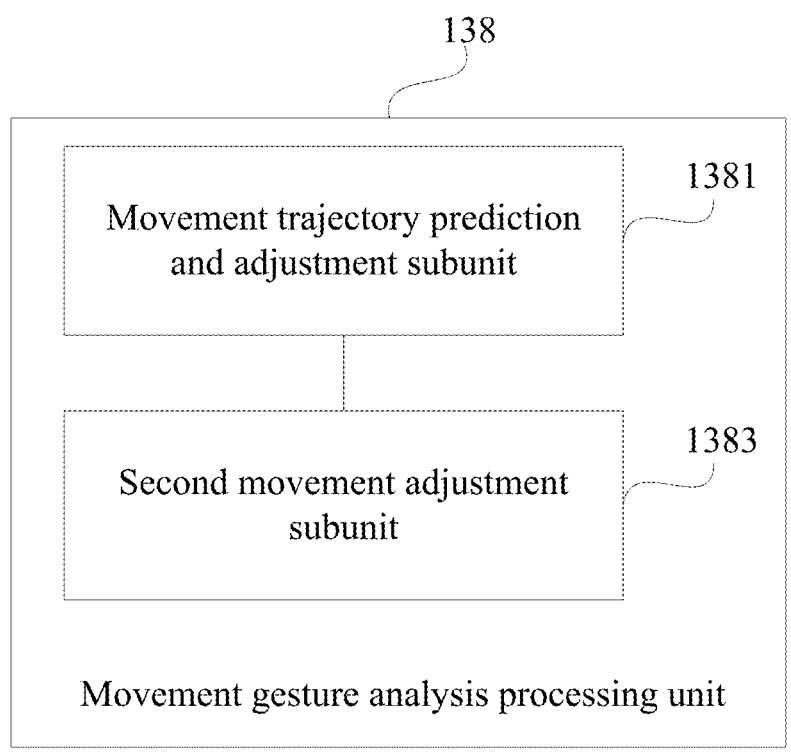
FIG. 5d is a schematic structural block diagram of a movement gesture analysis processing unit in an imaging apparatus according to an embodiment of the subject application.

In a possible implementation manner of an embodiment of the subject application, preferably, as shown in FIG. 5c and FIG. 5d, the movement gesture analysis unit 138 includes:

a first movement adjustment subunit 1382 or a second movement adjustment subunit 1383, used to, when a movement speed of the imaging apparatus 100 exceeds a set threshold value, adjust the imaging parameter of each subregion of the imaging lens module 110 to a set common imaging parameter or a mean value of imaging parameters of the subregions of the imaging lens module 110 at a previous moment. Here, the common imaging parameter may be, for example, the corresponding imaging parameter when the user comfortably watches an object at a common distance.

Figure 8:
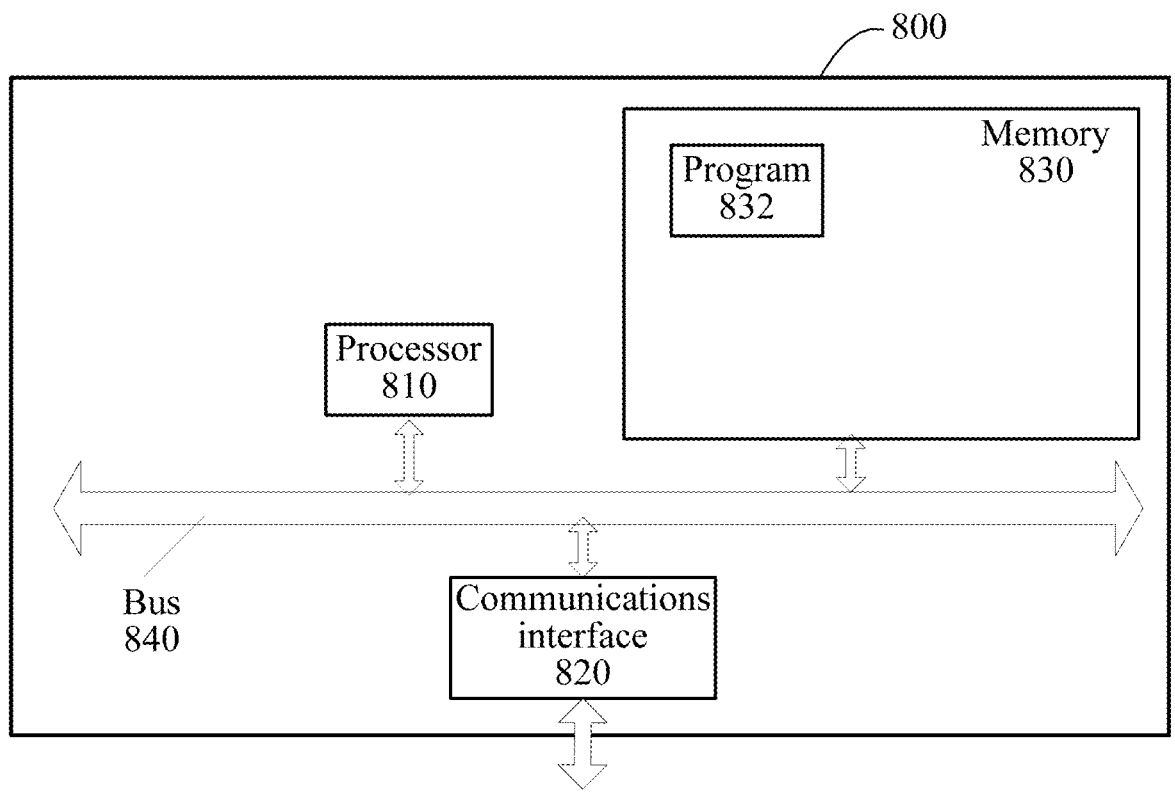
FIG. 8 is a structural block diagram of an information processing module of an imaging apparatus according to an embodiment of the subject application.

As shown in FIG. 8, in a possible implementation manner of an embodiment of the subject application, the information processing module 800 may, for example, include:

a processor 810, a communications interface 820, a memory 830, and a communications bus 840.

The communications among the processor 810, the communications interface 820, and the memory 830 are accomplished through the communications bus 840.

The communications interface 820 is used to perform network element communications.

The processor 810 is used to execute a program 832, and specifically can execute the functions corresponding to the units in the information processing module in FIG. 1 to FIG. 8.

Specifically, the program 832 may include a program code, and the program code includes a computer operation instruction.

The processor 810 may be a central processing unit (CPU), or an application specific integrated circuit (ASIC), or one or more integrated circuits configured to implement an embodiment of the subject application.

The memory 830 is used to store the program 832. The memory 830 may contain a high-speed random access memory (RAM) memory, or may also further include a non-volatile memory, for example, at least one disk memory. The program 832 can specifically enable the information processing module 800 to execute the following steps:

learning corresponding imaging parameters when the imaging receiver acquires expected images of objects at a plurality of distances, and obtaining refractive examination information corresponding to the imaging receiver;

calculating a distance of at least one object relative to the imaging lens module according to the position information of the at least one object relative to the imaging apparatus;

determining a subregion corresponding to the object on the imaging lens module; and calculating an imaging parameter of a corresponding subregion for each object according to a distance of each object relative to the imaging lens module and the refractive examination information.

The specific implementation of the steps in the program 832 can be referred to the corresponding description of corresponding steps or units in embodiments, which is no longer elaborated here. A person skilled in the art shall clearly understand that for convenience and simplicity of description, the specific work process of devices and modules described above can be referred to the description of the corresponding process in the foregoing method embodiments, which is no longer elaborated here.

Figure 9:
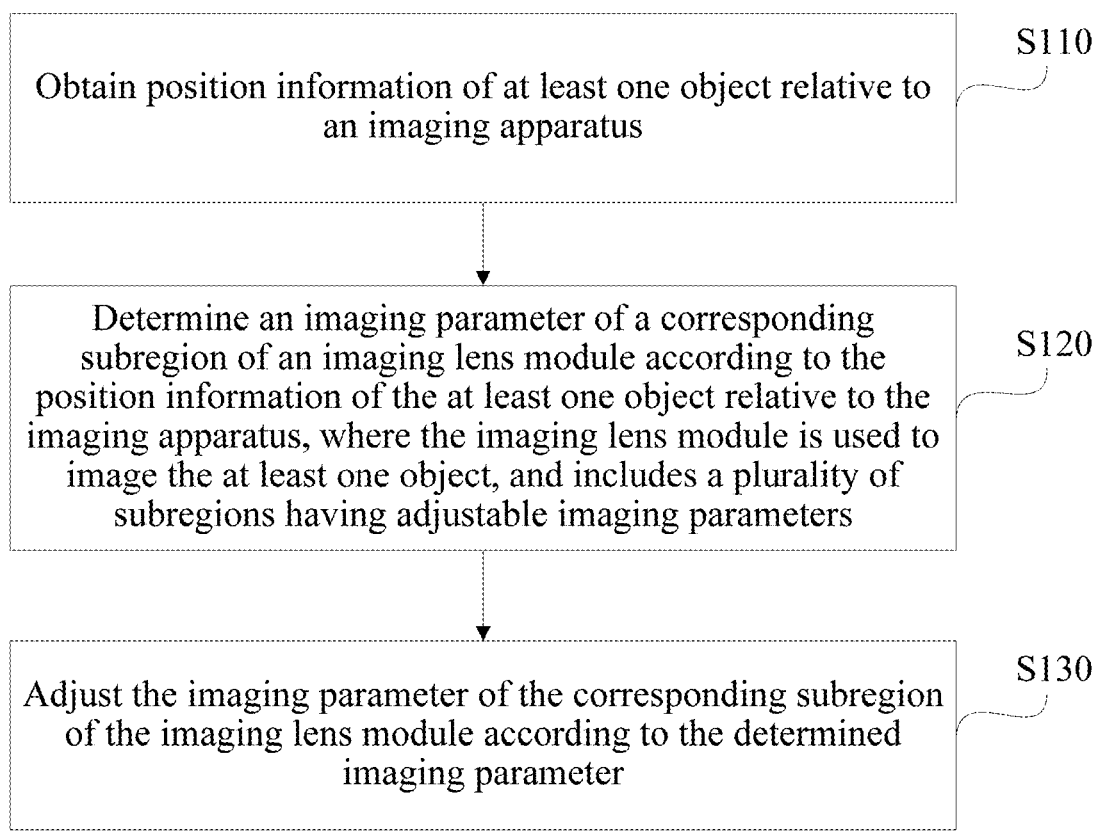
FIG. 9 is a schematic flow chart of an imaging method according to an embodiment of the subject application.

As shown in FIG. 9, a possible implementation manner of an embodiment of the subject application discloses an imaging method, which includes:

S110: Obtain position information of at least one object relative to an imaging apparatus.

S120: Determine an imaging parameter of a corresponding subregion of an imaging lens module according to the position information of the at least one object relative to the imaging apparatus, where the imaging lens module is used to image the at least one object, and includes a plurality of subregions having adjustable imaging parameters. The subregions here may be subregions physically independent from each other, or may also be subregions obtained by logically dividing an imaging lens module that is practically a whole physically.

S130: Adjust the imaging parameter of the corresponding subregion of the imaging lens module according to the determined imaging parameter.

Through the imaging apparatus in an embodiment of the subject application, the imaging parameter may be adjusted for regions corresponding to a plurality of target objects at different distances in a visual field at the same time, which enables a user to comfortably watch objects at different distances in the visual field, thereby improving user experience.

Preferably, in a possible implementation manner of an embodiment of the subject application, the imaging lens module includes at least one lens.

Preferably, in a possible implementation manner of an embodiment of the subject application, the imaging parameter of the subregion includes: a shape and/or a refractive index of a lens of the subregion.

Preferably, in a possible implementation manner of an embodiment of the subject application, the subregions of the imaging lens module are distributed in an array. Preferably, the subregions are distributed in a rectangular array or the subregions are distributed in a radially concentric array.

Specifically, the structure of the imaging lens module is as discussed in the foregoing apparatus embodiment, which is no longer described here.

Preferably, in a possible implementation manner of an embodiment of the subject application, the step of obtaining position information of at least one object relative to an imaging apparatus includes: acquiring position and depth information of the at least one object relative to the imaging apparatus.

In other possible implementation manners of an embodiment of the subject application, the step of obtaining position information of at least one object relative to an imaging apparatus includes: acquiring image information of the at least one object.

The implementation manner of the subject application may obtain the position information of at least one object relative to the imaging apparatus according to the position and depth information of the object relative to the imaging apparatus or the image information of the object, and the specific implementation manner is as discussed in the foregoing apparatus embodiment, which is no longer described here.

Figure 10:
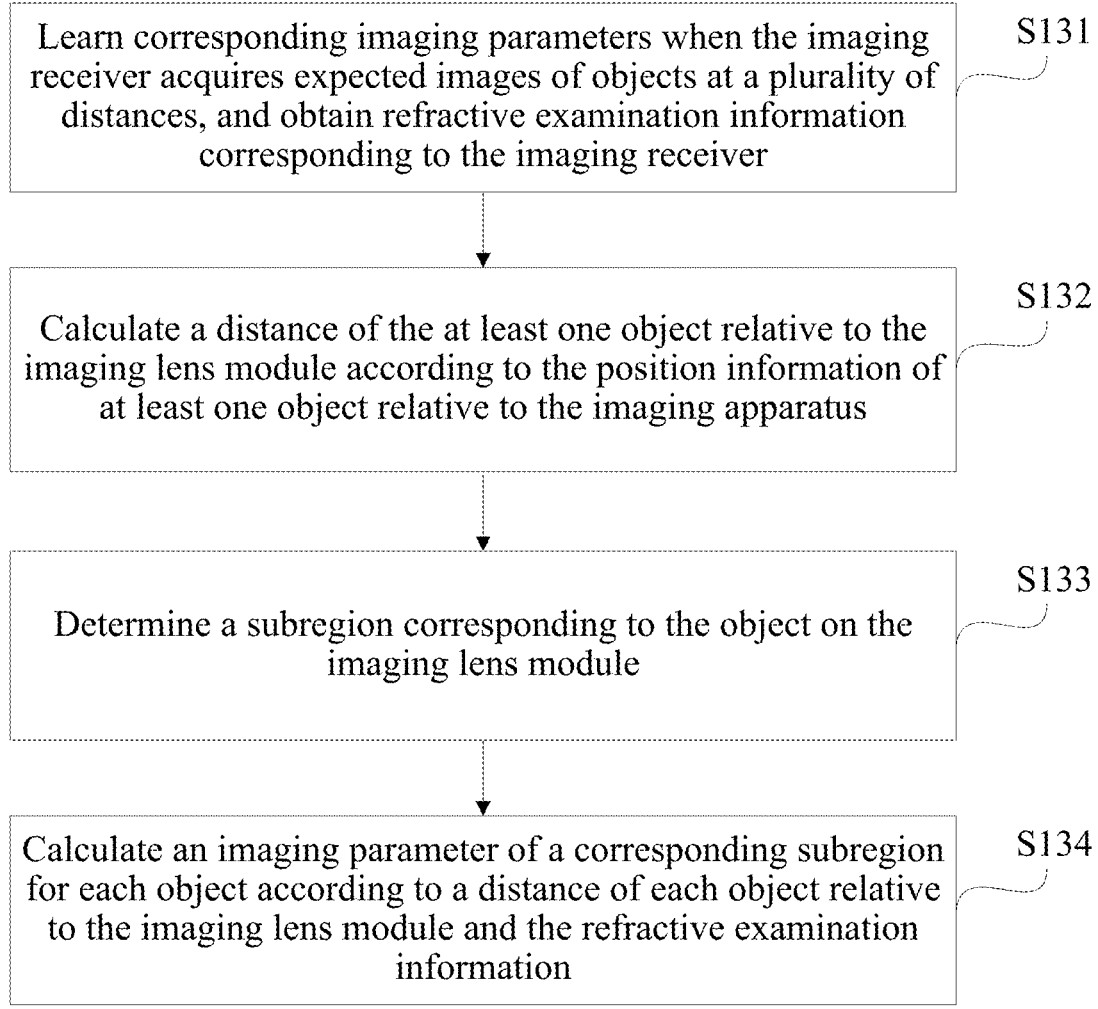
FIG. 10 is a schematic flow chart of steps of an imaging method according to an embodiment of the subject application.

As shown in FIG. 10, in this implementation manner, preferably, the step of determining an imaging parameter of a corresponding subregion of an imaging lens module according to the position information of the at least one object relative to the imaging apparatus includes:

S131: Learn corresponding imaging parameters when the imaging receiver acquires expected images of objects at a plurality of distances, and obtain refractive examination information corresponding to the imaging receiver.

S132: Calculate a distance of the at least one object relative to the imaging lens module according to the position information of at least one object relative to the imaging apparatus.

S133: Determine a subregion corresponding to the object on the imaging lens module.

S134: Calculate an imaging parameter of a corresponding subregion for each object according to a distance of each object relative to the imaging lens module and the refractive examination information. Preferably, imaging parameters of other subregions between subregions corresponding to the objects are obtained through a two-dimensional interpolation algorithm.

Preferably, in a possible implementation manner of an embodiment of the subject application, Step S130 further includes: determining a relative position relationship among the imaging lens module, the position sensing module, and an imaging receiver.

Preferably, in a possible implementation manner of an embodiment of the subject application, the method further includes: performing smoothing processing of time on the current imaging parameter of each subregion according to history information of each subregion imaging parameter.

Preferably, in a possible implementation manner of an embodiment of the subject application, the method further includes: performing smoothing processing of space on the imaging parameter of each subregion according to the imaging parameter of each subregion of the imaging lens module.

Preferably, in a possible implementation manner of an embodiment of the subject application, the method further includes: the step of acquiring movement gesture information of the imaging apparatus.

Preferably, in a possible implementation manner of an embodiment of the subject application, the method further includes: determining the imaging parameter of the corresponding subregion of the imaging lens module according to the movement gesture information of the imaging apparatus. Preferably, the movement gesture information of the imaging apparatus includes: the relative movement gesture information of the imaging apparatus and the object and/or the movement speed information of the imaging apparatus.

Preferably, in a possible implementation manner of an embodiment of the subject application, the step of determining the imaging parameter of the corresponding subregion of the imaging lens module according to movement gesture information of the imaging apparatus includes:

predicting an imaging parameter of a corresponding subregion of the object at a next moment according to the relative movement gesture information of the imaging apparatus and the object and an imaging parameter of a corresponding subregion of the object at a current moment.

Preferably, in a possible implementation manner of an embodiment of the subject application, the step of determining the imaging parameter of the corresponding subregion of the imaging lens module according to movement gesture information of the imaging apparatus includes:

adjusting the imaging parameter of each subregion of the imaging lens module to a set common imaging parameter when a movement speed of the imaging apparatus exceeds a set threshold value.

Preferably, in a possible implementation manner of an embodiment of the subject application, the step of determining the imaging parameter of the corresponding subregion of the imaging lens module according to movement gesture information of the imaging apparatus includes:

adjusting the imaging parameter of each subregion of the imaging lens module to a mean value of imaging parameters of subregions of the imaging lens module at a previous moment when a movement speed of the imaging apparatus exceeds a set threshold value.

The specific implementation manner of the foregoing steps may be implemented according to the corresponding description of the foregoing apparatus embodiment, which is no longer described here.

A person skilled in the art may understand that in the method of the specific implementation manner of the subject application, the sequence numbers of the steps do not mean a specific execution sequence, and the execution sequence of the steps should be determined based on the functions and internal logic thereof, rather to constitute any limitation on the implementation process of the specific implementation manner of the subject application.

A method of an embodiment of the subject application enables a user to obtain the clearest effect when watching a real scenario.

Persons of ordinary skill in the art may further appreciate that, in combination with the examples described in embodiments herein, units and algorithm steps may be implemented by electronic hardware or a combination of computer software and electronic hardware. Whether these functions are performed using hardware or software depends on particular applications and design constraints of the technical solutions. A person skilled in the art may use different methods to implement the described functions for each specific application. However, such implementation should not be considered as beyond the scope of the subject application.

If implemented in the form of software functional units and sold or used as an independent product, the functions may also be stored in a computer readable storage medium. Based on this, the above technical solution or the part that makes contributions to the prior art can be substantially embodied in the form of a software product. The computer software product may be stored in a storage medium and contain several instructions to instruct computer equipment (for example, a personal computer, a server, or network equipment) to perform all or a part of the steps of the method described in embodiments of the subject application. The storage medium may be any medium that is capable of storing program codes, such as a universal serial bus (USB) flash drive, a removable hard disk, a read-only memory (ROM), a RAM, a magnetic disk or an optical disk.

The above implementation manners are merely provided for describing the various embodiments, but not intended to limit the present inventions. It should be understood by persons of ordinary skill in the art that various changes and variations can be made without departing from the spirit and scope of the present inventions as defined by the claims of the present inventions.

What is claimed is:

1. An imaging apparatus, comprising:
an imaging lens module configured to project at least one image, directly to at least one eye of a user, of multiple objects at different distances from the apparatus, and comprising a plurality of subregions, wherein the imaging lens module comprises at least one lens, imaging parameters of each of the plurality of subregions are adjustable, and the plurality of subregions are subregions physically independent from each other, or logical subregions obtained by logically dividing one physically integral imaging lens module;

a processor, communicatively coupled to a memory that stores computer-executable instructions, that executes or facilitates execution of the computer-executable instructions to perform operations comprising:

obtain position information of the multiple objects relative to the apparatus;

determine the imaging parameters of multiple subregions of the imaging lens module corresponding to the multiple objects based on the position information of the multiple objects relative to the apparatus, wherein each of the multiple objects corresponds to one or more subregions of the multiple subregions; and adjust, concurrently, the imaging parameters of the multiple subregions of the imaging lens module corresponding to the multiple objects respectively based on the imaging parameters.

2. The apparatus of claim 1, wherein the operations further comprise:

learn corresponding imaging parameters associated with the at least one eye of the user acquiring expected images of objects at a plurality of distances, and obtain refractive examination information corresponding to the at least one eye of the user.

3. The apparatus of claim 2, wherein the operations further comprise:

determine an imaging parameter of the imaging parameters of at least one corresponding subregion for each object based on a respective distance of each object relative to the imaging lens module and the refractive examination information.

4. The apparatus of claim 3, wherein the further operations further comprise:

obtain other imaging parameters of other subregions between subregions corresponding to each object using a two-dimensional interpolation.

5. The apparatus of claim 1, wherein the operations further comprise:

determine respective distances of the multiple objects relative to the imaging lens module based on the position information of the multiple objects relative to the imaging apparatus.

6. The apparatus of claim 1, wherein the operations further comprise:

determine the multiple subregions corresponding to the multiple objects on the imaging lens module.

7. The apparatus of claim 1, wherein the operations further comprise:

determine a relative position relationship among the imaging lens module, the position sensing module, and the at least one eye of the user.

8. The apparatus of claim 1, wherein operations further comprise:

determine an imaging parameter of the imaging parameters of a corresponding subregion of the multiple corresponding subregions of the imaging lens module based on movement gesture information of the imaging apparatus.

9. The apparatus of claim 8, wherein the operations further comprise:

predict another imaging parameter of another corresponding subregion of the multiple objects at a next moment after a current moment based on relative movement gesture information of the imaging apparatus and the multiple objects, and the imaging parameter of the corresponding subregion of the multiple corresponding subregions of the multiple objects at the current moment.

10. The apparatus of claim 8, wherein the operations further comprise:

adjust respective imaging parameters of each subregion, of the multiple corresponding subregions, of the imaging lens module to a set common imaging parameter when a movement speed of the imaging apparatus is determined to exceed a set threshold value.

11. The apparatus of claim 8, wherein the operations further comprise:

adjust respective imaging parameters of each subregion, of the multiple corresponding subregions, of the imaging lens module to a mean value of imaging parameters of the multiple corresponding subregions of the imaging lens module at a previous moment when a movement speed of the imaging apparatus is determined to exceed a set threshold value.

12. The apparatus of claim 8, wherein the operations further comprise:

acquire the movement gesture information of the imaging apparatus.

13. The apparatus of claim 12, wherein the movement gesture information of the imaging apparatus comprises at least one of relative movement gesture information of the imaging apparatus and the multiple objects, or movement speed information of the imaging apparatus.

14. The apparatus of claim 1, wherein the operations further comprise:

perform smoothing processing of time on respective current imaging parameters of each subregion of the multiple corresponding subregions based on history information of the imaging parameter of each subregion.

15. The apparatus of claim 1, wherein the operations further comprise:

perform smoothing processing of space on the imaging parameter of each subregion of the multiple corresponding subregions based on the imaging parameter of each subregion of the imaging lens module.

16. The apparatus of claim 1, wherein an imaging parameter of the imaging parameters of a subregion of the multiple subregions comprises at least one of a shape or a refractive index of a lens of the multiple corresponding subregions.

17. The apparatus of claim 1, wherein the plurality of subregions of the imaging lens module are distributed in an array.

18. The apparatus of claim 17, wherein the plurality of subregions are distributed in a rectangular array.

19. The apparatus of claim 17, wherein the plurality of subregions are distributed in a radially concentric array.

20. The apparatus of claim 1, wherein the operations further comprise:

acquire position and depth information of the multiple objects relative to the imaging apparatus.

21. The apparatus of claim 1, further comprising:

an image sensor configured to acquire image information of the multiple objects.

22. The apparatus of claim 1, wherein the imaging apparatus is eyeglasses.

23. A method, comprising:

obtaining, by a system comprising a processor, position information of multiple objects at different distances relative to an imaging apparatus;

determining, by the system, imaging parameters of multiple subregions of an imaging lens module corresponding to the multiple objects based on the position information of the multiple objects relative to the imaging apparatus, wherein each of the multiple objects corresponds to one or more subregions of the multiple subregions, wherein the imaging lens module comprises at least one lens and is used to project at least one image, directly to at least one eye of a user, of the multiple objects, and further comprises a plurality of subregions, wherein the imaging parameters of each of the plurality of subregions are adjustable, and the plurality of subregions are subregions physically independent from each other, or logical subregions obtained by logically dividing one physically integral imaging lens module; and adjusting, by the system concurrently, the imaging parameters of the multiple subregions of the imaging lens module corresponding to the multiple objects respectively based on the imaging parameters.

24. The method according to claim 23, wherein the determining the imaging parameters of the multiple subregions of the imaging lens module corresponding to the multiple objects based on the position information of the multiple objects relative to the imaging apparatus comprises:

determining corresponding imaging parameters of the imaging parameters in response to acquisition of expected images of the-multiple objects at a plurality of distances by the at least one eye of a user, and obtaining refractive examination information corresponding to the at least one eye of a user.

25. The method of claim 24, wherein the determining the imaging parameters of the multiple subregions of the imaging lens module corresponding to the multiple objects based on the position information of the multiple objects relative to the imaging apparatus comprises:

determining an imaging parameter of the imaging parameters of at least one corresponding subregion for each object based on a respective distance of each object relative to the imaging lens module and the refractive examination information.

26. The method of claim 25, wherein other imaging parameters of other subregions between the plurality of subregions corresponding to each object are obtained through a two-dimensional interpolation.

27. The method of claim 23, wherein the determining the imaging parameters of the multiple subregions of the imaging lens module corresponding to the multiple objects based on the position information of the multiple objects relative to the imaging apparatus comprises:

determining distances of the multiple objects relative to the imaging lens module based on the position information of the multiple objects relative to the imaging apparatus.

28. The method of claim 23, wherein the determining the imaging parameters of the multiple subregions of the imaging lens module corresponding to the multiple objects based on the position information of the multiple objects relative to the imaging apparatus comprises:

determining the multiple subregions corresponding to the multiple objects on the imaging lens module.

29. The method according to of claim 23, wherein the determining the imaging parameters of the multiple subregions of the imaging lens module corresponding to the multiple objects based on the position information of the multiple objects relative to the imaging apparatus comprises:

determining a relative position relationship among the imaging lens module, the position sensing module, and the at least one eye of the user.

30. The method of claim 23, further comprising:

determining, by the system, an imaging parameter of the imaging parameters of a corresponding subregion of the multiple corresponding subregions of the imaging lens module based on movement gesture information of the imaging apparatus.

31. The method of claim 30, wherein the determining the imaging parameter of the corresponding subregion of the multiple corresponding subregions of the imaging lens module based on the movement gesture information of the imaging apparatus comprises:

predicting the imaging parameter of the corresponding subregion of the multiple objects at a next moment after a current moment based on relative movement gesture information of the imaging apparatus and the multiple objects, and the imaging parameter of the corresponding subregions of the multiple corresponding subregions of the multiple objects at the current moment.

32. The method of claim 30, wherein the determining the imaging parameter of the corresponding subregion of multiple corresponding subregions of the imaging lens module based on the movement gesture information of the imaging apparatus comprises:

adjusting respective imaging parameters of each subregion of the plurality of subregions of the imaging lens module to a set common imaging parameter in response to determining a movement speed of the imaging apparatus has exceeded a set threshold value.

33. The method of claim 30, wherein the determining the imaging parameter of the corresponding subregion of the multiple corresponding subregions of the imaging lens module based on the movement gesture information of the imaging apparatus comprises:

adjusting respective imaging parameters of each subregion of the plurality of subregions of the imaging lens module to a mean value of imaging parameters of the plurality of subregions of the imaging lens module at a previous moment in response to determining a movement speed of the imaging apparatus has exceeded a set threshold value.

34. The method of claim 30, further comprising:

acquiring, by the system, the movement gesture information of the imaging apparatus.

35. The method of claim 34, wherein the movement gesture information of the imaging apparatus comprises at least one of relative movement gesture information of the imaging apparatus and the object, or movement speed information of the imaging apparatus.

36. The method of claim 23, further comprising:

performing, by the system, smoothing processing of time on a respective current imaging parameter of each subregion of the plurality of subregions based on history information of the imaging parameter of each subregion.

37. The method of claim 23, further comprising:

performing, by the system, smoothing processing of space on the imaging parameter of each subregion of the plurality of subregions based on the imaging parameter of each subregion of the imaging lens module.

38. The method of claim 23, wherein an imaging parameter of the imaging parameters of a subregion of the multiple subregions comprises at least one of a shape or a refractive index of a lens of the multiple corresponding subregions.

39. The method of claim 23, wherein the plurality of subregions of the imaging lens module is distributed in an array.

40. The method of claim 39, wherein the plurality of subregions is distributed in a rectangular array.

41. The method of claim 39, wherein the plurality of subregions are distributed in a radially concentric array.

42. The method of claim 23, wherein the obtaining the position information of the multiple objects at different distances relative to the imaging apparatus comprises:
acquiring, by the system, position and depth information of the multiple objects relative to the imaging apparatus.

43. The method of claim 23, wherein the obtaining the position information of the multiple objects at different distances relative to the imaging apparatus comprises:
acquiring image information of the multiple objects.

44. A non-transitory computer readable medium comprising executable instructions that, in response to execution, cause a device comprising a processor to perform operations, comprising:
obtaining position information of multiple objects relative to an imaging apparatus;
determining imaging parameters of multiple subregions of an imaging lens module corresponding to the multiple objects based on the position information of the multiple objects relative to the imaging apparatus, wherein each of the multiple objects corresponds to one or more subregions of the multiple subregions, wherein the imaging lens module comprises at least one lens and is used to project at least one image, directly to at least one eye of a user, of the multiple objects, and further comprises a plurality of subregions, wherein the imaging parameters of each of the plurality of subregions is adjustable, and the plurality of subregions are subregions physically independent from each other, or logical subregions obtained by logically dividing one physically integral imaging lens module; and
adjusting, concurrently, the imaging parameters of multiple subregions of the imaging lens module corresponding to the multiple objects respectively based on the imaging parameters.

45. The method of claim 22, wherein if the distance between an object and the imaging apparatus is 1 m, the imaging parameter of the subregion corresponding to the object corresponds to the refractivity of −5.75; and
if the distance between an object and the imaging apparatus is 0.8 m, the optimal refractivity corresponding to the distance of 0.8 m is obtained through an interpolation method according to corresponding optimal refractivities of 0.5 m and 1 m.

46. The non-transitory computer readable medium of claim 44, wherein the multiple subregions of the imaging lens module are distributed in an array.

47. The non-transitory computer readable medium of claim 46, wherein the multiple subregions are distributed in a rectangular array.

48. The non-transitory computer readable medium of claim 46, wherein the plurality of subregions are distributed in a radially concentric array.

* * * * *